(12) United States Patent
Mahyar et al.

(10) Patent No.: US 12,526,485 B1
(45) Date of Patent: Jan. 13, 2026

(54) CONTENT AWARE GRAPHICAL SUBTITLES

(71) Applicant: Amazon Technologies, Inc., Seattle, WA (US)

(72) Inventors: Hooman Mahyar, Mercer Island, WA (US); James C. Willeford, Seattle, WA (US); Arjun Cholkar, Bothell, WA (US); Xinyu Li, Sammamish, WA (US); Zhikang Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 18/449,306

(22) Filed: Aug. 14, 2023

(51) Int. Cl.
*H04N 21/488* (2011.01)
*H04N 21/431* (2011.01)
*H04N 21/44* (2011.01)

(52) U.S. Cl.
CPC ..... *H04N 21/4884* (2013.01); *H04N 21/4316* (2013.01); *H04N 21/44008* (2013.01)

(58) Field of Classification Search
CPC ........... H04N 21/4884; H04N 21/4316; H04N 21/44008
USPC ........................................................ 348/468
See application file for complete search history.

(56) References Cited

U.S. PATENT DOCUMENTS

| 11,211,053 | B2* | 12/2021 | Aronowitz | G10L 15/07 |
|---|---|---|---|---|
| 2006/0064716 | A1* | 3/2006 | Sull | G06F 16/784 |
| | | | | 715/201 |
| 2014/0278370 | A1* | 9/2014 | Chen | G06F 40/30 |
| | | | | 704/9 |
| 2023/0007359 | A1* | 1/2023 | Aher | G06F 16/7844 |
| 2023/0362451 | A1* | 11/2023 | Candelore | H04N 21/4532 |

\* cited by examiner

*Primary Examiner* — John W Miller
*Assistant Examiner* — Omer Khalid
(74) *Attorney, Agent, or Firm* — Eversheds Sutherland (US) LLP

(57) ABSTRACT

Systems, devices, and methods are provided for context aware graphical subtitles. Techniques described herein may involve determining a representation for a graphical subtitle. The graphical subtitles may have various customizable properties that allow for creative expression. Representations of graphical subtitles may be determined using lower-level information extracted from detectors, such as audio detectors and/or visual detectors, as well as higher-level information determined by encoder-decoders.

20 Claims, 7 Drawing Sheets

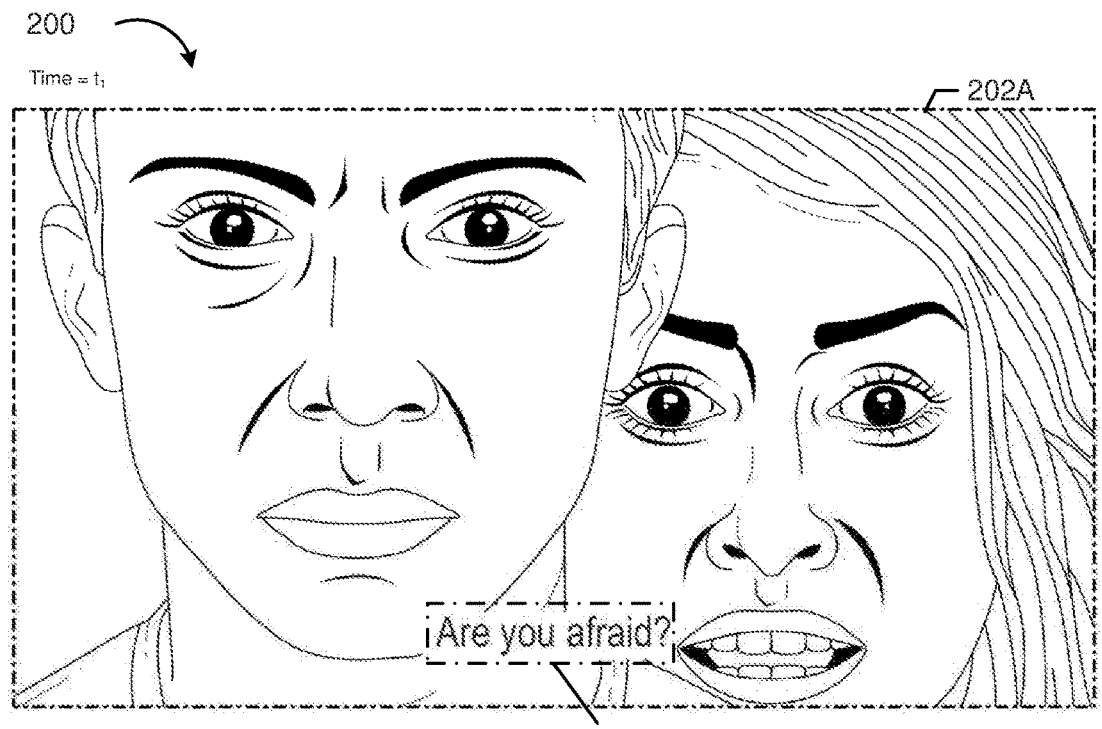
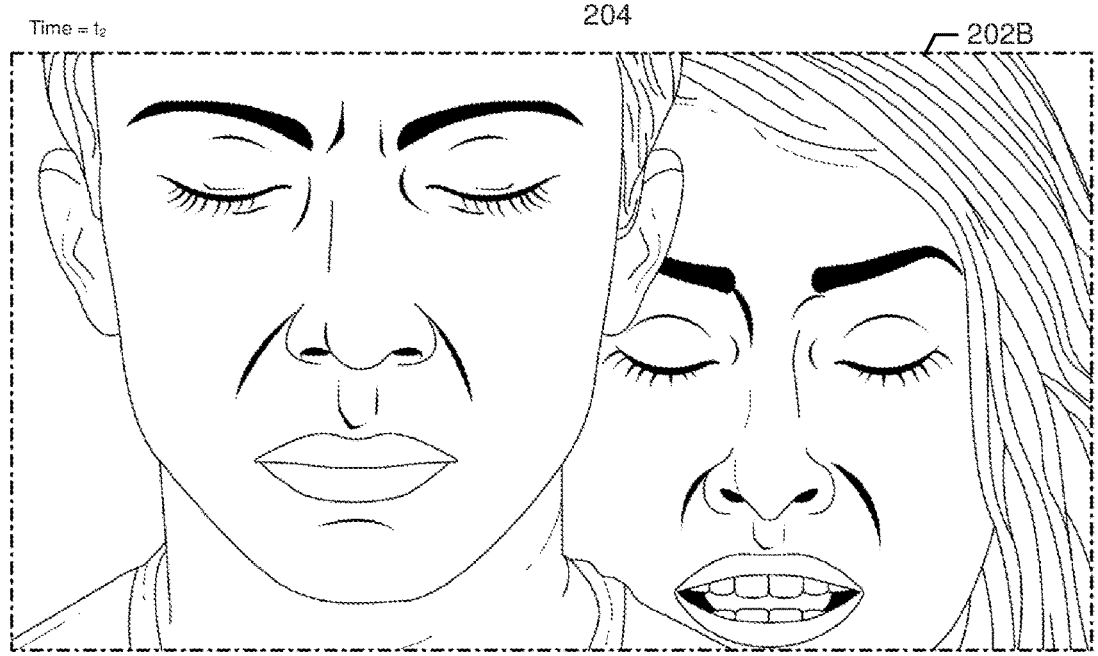
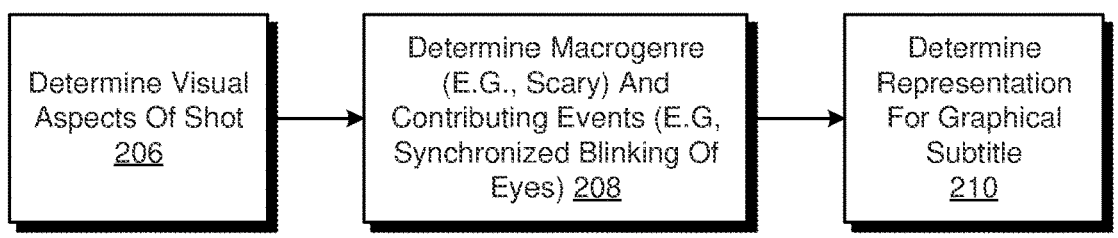
FIG. 2

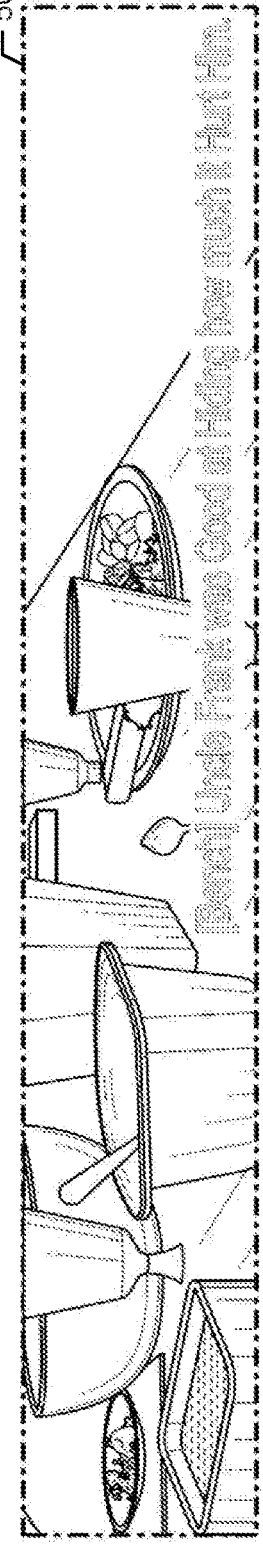
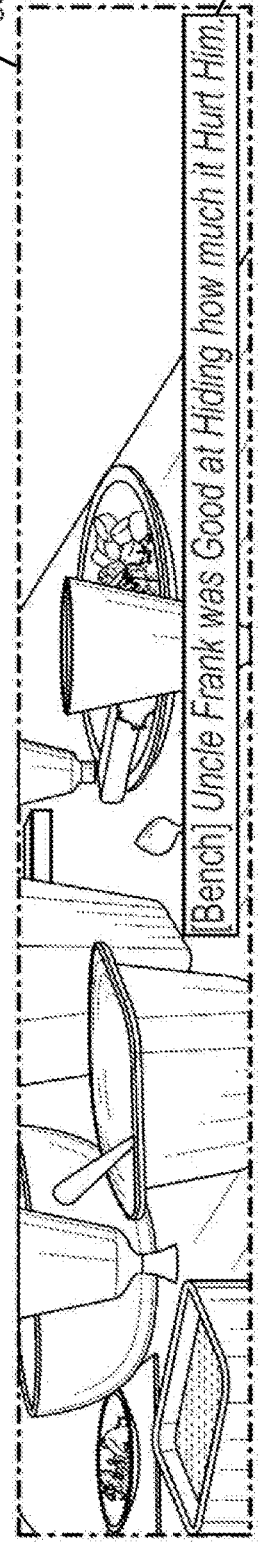
FIG. 5

CONTENT AWARE GRAPHICAL SUBTITLES

BACKGROUND

Subtitles in media content can play an important role in the how viewers consume and enjoy content. Viewers' consumption of media content can be enhanced through the use of subtitles, which can be used to allow viewers to enjoy content that includes audio content from a foreign language, provide greater accessibility of the content to viewers with hearing impairment, and more. However, traditional subtitles have many shortcomings. Subtitles are primarily presented as text on the screen, which means they lack the nuances and expressiveness of spoken language. Certain elements such as tone, sarcasm, or emotions conveyed through vocal intonation can be lost in the translation to text, leading to a less immersive experience.

Subtitles often involve translating the original dialogue into another language. This process can be challenging due to linguistic and cultural differences, resulting in potential inaccuracies, loss of context, or simplification of complex phrases. Sometimes, jokes or wordplay may be difficult to translate effectively, leading to a loss of humor or cultural references.

Subtitles are also constrained by the available screen space and. Subtitles are typically positioned at the bottom of the screen so that they are located in a position that is predictable to the viewer. However, this placement can sometimes obstruct important visual elements or subtitles already present in the original content, such as on-screen text or captions for sign language. Additionally, text properties such as the font size, color, and contrast of subtitles can vary, making them challenging to read, especially for viewers with visual impairments.

Additionally, nuances in how a scene is being presented can be difficult to capture using subtitles. For example, in scenes with multiple characters speaking simultaneously, it can be difficult to differentiate and attribute specific dialogue to each character. Additionally, traditional subtitles typically do not adequately capture non-verbal cues, environmental sounds, or other audiovisual elements that contribute to the overall storytelling.

Accordingly, there are many shortcomings in traditional subtitles that can diminish a viewer's enjoyment of the digital media content and a present need to overcome some or all of the shortcomings described above.

BRIEF DESCRIPTION OF THE DRAWINGS

FIG. 2 illustrates a diagram 200 of a graphical subtitle that blinks in synchronization with the visual aspects of the digital media being shown, in accordance with one or more example embodiments of the present disclosure.

FIG. 5 illustrates a diagram 500 of a graphical subtitle representation whose font and/or background color is determined based on the color palette being presented, in accordance with one or more example embodiments of the present disclosure.

Figure 1:
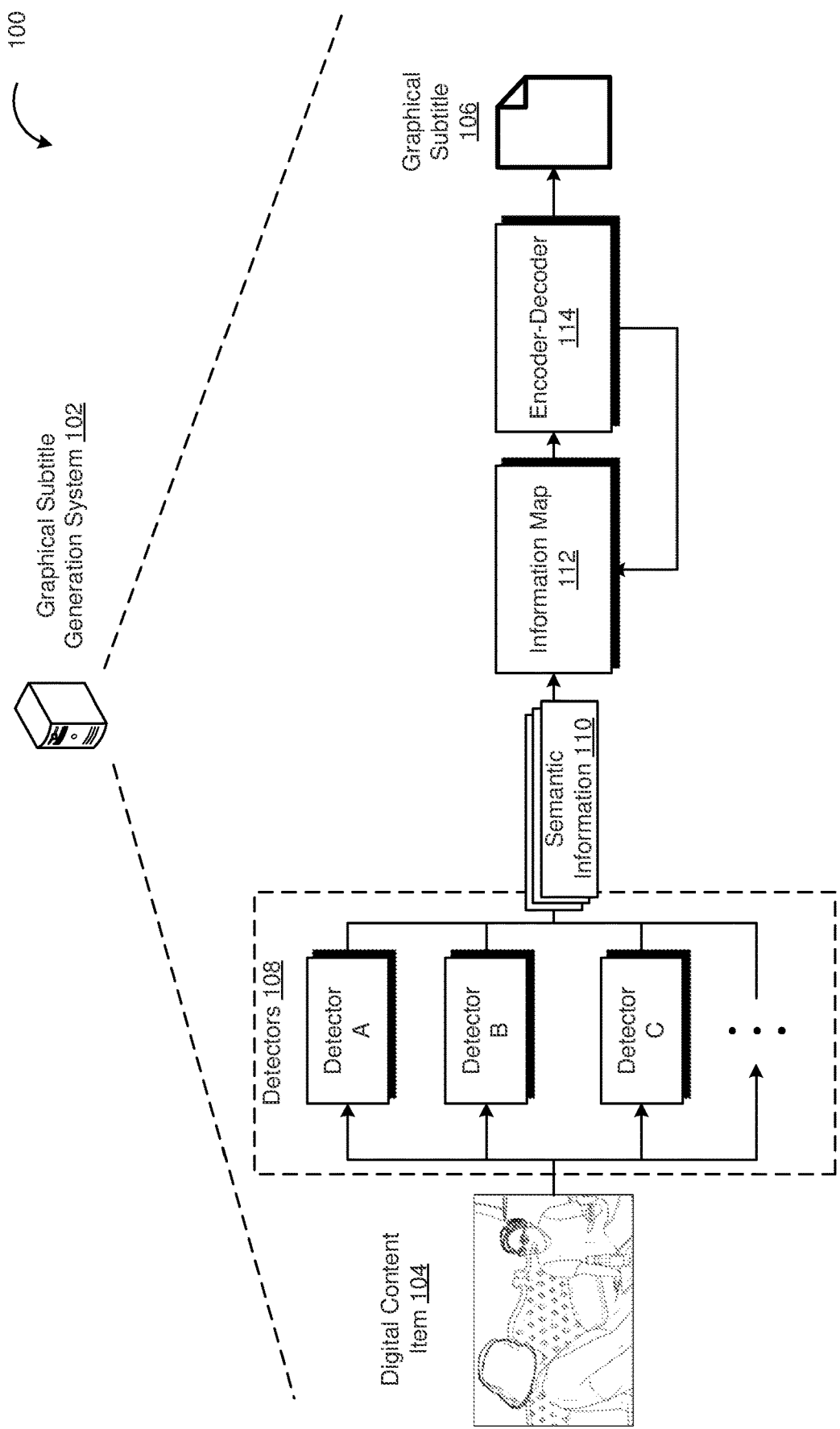
FIG. 1 illustrates a computing environment 100 in which graphical subtitles may be determined, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for context aware graphical subtitles. Graphical subtitles may be implemented in the context of digital media content such as movies and television shows to present subtitles in a manner that is more enjoyable to viewers as they consume the content. In contrast to traditional subtitles that only provide basic, text-based information based on audio of a digital content source, techniques described herein may incorporate other information into subtitles and/or determine the best location and visual characteristics to represent the information. For instance, an offensive or funny sentence that is spoken in a foreign language might get lost in translation. Graphical subtitles may perform textual analysis to understand this context and add graphical information to the subtitle (emoji, font, etc. . . . ) to inform viewers. Additionally, in at least some embodiments, static information in a video frame is analyzed to understand the context of the video from and to select the best location to display the subtitle with minimum distribution to the visual scene. In various embodiments, a graphical subtitle generation system is capable of understanding the visual, acoustic, and textual context in digital media content and informs viewers by creating graphical and more informative subtitles.

The above descriptions are for purposes of illustration and are not meant to be limiting. Numerous other examples, configurations, processes, etc., may exist, some of which are described in greater detail below. Example embodiments will now be described with reference to the accompanying figures.

Techniques described herein related to the determination and generation of context aware graphical subtitles. Conventional subtitles typically lack creative or contextual awareness, and is generally presented as one or more lines of uniform text at a predetermined location in digital content, for example, at the bottom of a frame. A deeper level of understanding of the context in which content is being played—which may take into account various aspects of the content such as dialog, audio, and visual information—is utilized herein to determine representations for subtitles that are appropriate for a given context.

Subtitle representations may refer to one or more customizable aspects of how subtitles are represented. Aspects of subtitle representation (e.g., text properties) that are customizable may include, as non-limiting examples: the location of the subtitle; the color of the subtitle text; the font of the subtitle text; the size of the subtitle text; whether or not to have a background color to the subtitle text; the color of the background color, if applicable; animations and/or color associated with the subtitle text; and so on and so forth. Generally speaking, subtitle representations may include different aspects of the presentation of subtitles that can be customized or altered to convey more information through subtitles than merely text. For example, the manner in which a subtitle is presented may change depending on dialog, visual, and/or audio information present in a scene or shot. Shots, scenes, or frames of digital content may be analyzed to determine information regarding the content being shown, such as one or more macrogenres, and may be used to determine the subtitle representation.

As an example, a context aware graphical subtitle may be generated based at least in part on macrogenre information associated with a frame, shot, or scene. A macrogenre may refer to a broad category or classification that encompasses multiple related genres and represents a higher level of classification that groups together various genres based on similar thematic elements, narrative structures, or audience appeal. For example, in a horror movie scene where an actor blinks his or her eyes intensely to convey fear, the subtitles for the scene may disappear and reappear as the actor's eyes close and open. As a second example, if an actor is speaking and gesturing in an animated fashion, the subtitles may be strategically placed at inactive areas of the screen and animated to convey excitement. In some embodiments, an appropriate color, palette may be selected for presenting the subtitles based on visual characteristics in a scene. In some embodiments, the subtitles may be animated, colored, or presented on fonts that are context aware, for example, through the use of fonts that are considered to have more playful, friendly, or whimsical aesthetics for humorous or kid-friendly scenes.

In various embodiments, dialog, audio, and visual information of digital media content is analyzed. Semantic characteristics of a scene, shot, or frame may be determined using machine-learning (ML) models. The sematic information may be provided to an information map that encodes a graph-like structure of information known about the digital content. Information regarding what is being seen, the feelings and emotions being conveyed in the content item, semantic and higher-level meanings, etc. are captured in the information map to provide a deeper understanding of what is being presented in the media content. Furthermore, another aspect involves determining how to represent that information, which can involve creative input by content creators, programmatic rules, or a combination of both. A representation can be determined for graphical subtitles in a standard (e.g., 2D) movie, or for 3D representations such as when content is being watched using augmented reality (AR) and/or virtual reality (VR) technologies.

As an illustrative example, consider a hypothetical scene from a movie or show in which two magical wizards (e.g., a protagonist and antagonist) are preparing to fight each other. The scene may involve a dialog in which the two characters exchange words in alternating shots that build up tension and ultimately leads to a battle between the two in which they simultaneously cast magical spells against each other by uttering an incantation, such as "abracadabra!" or "alakazam!" or the like, in which the protagonist shoots out blue lighting towards the antagonist, who also shoots out green lighting that intercepts the blue lighting and causes a bright explosion. As an illustrative, non-limiting example, dialog, audio, and visual information of the scene may be used to determine a graphical subtitle in which the subtitle text for the incantation is animated and stylized, for example, by stylizing the spell words being uttered by each character in their corresponding dominant colors (e.g., green text for antagonist, blue text for protagonist) and disappearing with a bright flash over the characters that synchronizes with the bright explosion when the green and blue lightning bolts collide and explode.

In contrast, a conventional subtitle system may simply display white text that is centered at the bottom of the screen throughout an entire scene without deviation or variation based on the speaker or the content of the speech. This type of subtitle presentation fails to capture much of the drama or content of a scene. Techniques described herein relate to a context aware graphical subtitle generation system as described herein, and according to at least one embodiment of the present disclosure, analyzes dialog, audio, and visual information of the scene to extract various features and semantic elements. An information map is generated based on these elements and features. For example, these elements and features may encode how the scene includes alternating shots between the protagonist and antagonist and that there is speech of the characters both while they are on screen and when they are off screen. A subtitle representation may be generated based on various aspects of the scene, such as dialog, audio, and visual information.

Graphical subtitles provide content creators with a variety of ways in which various aspects of the emotion and content of content can be expressed. In some embodiments, there are different levels of automation that can be provided in generating graphical subtitles, which can involve fully automated graphical subtitles as well as those that involve creative input by content creators regarding the types of graphical effects and representations that can more effectively convey the emotion and meaning of a dialog, shot, scene, etc.

The manner in which graphical subtitles may be determined and generated will be described in greater detail below. There can be several different aspects to graphical subtitles. Generally speaking, conventional subtitles merely take audio content from a digital media content item and determine text for the audio content, such as through text-to-speech or displaying parenthetical text to indicate an explosion or other sounds. A graphical subtitle generation system, according to at least one embodiment of the present disclosure, can determine additional contextual information from a frame, shot, scene, etc. and incorporate that additional information into the generation of the subtitle. This can take various different forms, which can include where and when they show the subtitle, visual effects (e.g., animations) that can be presented along with the subtitle, the selection of a contextually relevant font, the display of the font in different regions of the screen and not just at the bottom of the screen, and so on and so forth. The graphical representations can be used by content creators to express a greater degree of creativity, which can evolve and change as more visual effects are made available.

According to at least one embodiment of the present disclosure, one aspect of graphical subtitles relates to the different types of information that are extracted from a digital content item. Different types of semantic information are extracted from a digital content item to provide richer insight into the dialog or emotion that is being conveyed in a frame, shot, scene, etc. The semantic information can be extracted from dialog, visual, and/or audio information. For example, a computer vision (CV) model may be used to identify an individual that is speaking in a shot or scene, a categorization of the speaker's facial expression, and so on and so fore. The semantic information can be used to determine the main objects and main focus of a frame or shot and finding the right location for subtitles that provide for minimal distractions to the viewer while also ensuring that the viewer can read the subtitles and all basic visual information. Semantic information is connected (e.g., in a synchronized manner) and an information map is generated to connect the different types of semantic information in a way that represents how the different pieces of semantic information relate to each other. In some embodiments, the information graph, or a subset thereof, is provided to a model that determines macrogenre related information from a frame, shot, scene, etc. and furthermore provides additional information that explains what aspects of the frame, shot, scene, etc. are related to the macrogenre. For example, in a horror movie, a shot may be scary because of the way in which the eyes of a protagonist blink in unison with the eyes of a villain that is silently standing behind the protagonist. This explanatory information may be generated based on the information map and then provided back to the information map to provide additional contextual information.

Another aspect of graphical subtitles relates to determining the graphical representation for subtitles based on the information map. A subtitle representation may refer to the specific manner in which certain context information is conveyed to the viewer. For example, continuing with the previous discussion of the horror shot, one way in which the subtitles for the shot may be represented is to have the subtitle text flash in and out of view (e.g., display and non-display of the subtitle text) in synchronization with the blinking of the protagonist and villain's eyes.

FIG. 1 illustrates a computing environment 100 in which graphical subtitles may be determined, in accordance with one or more example embodiments of the present disclosure.

According to at least one embodiment, computing environment 100 comprises a graphical subtitle generation system 102, which may be implemented as hardware and/or software. Machines, such as those described in connection with FIG. 7 below, may be utilized to implement graphical subtitle generation system 102. Graphical subtitle generation system 102 may be implemented in the context of a cloud service provider, for example, as a component utilized within a multimedia streaming service.

Graphical subtitle generation system 102 may receive various digital content items, such as digital content item 104, which are processed to generate graphical subtitles 106. Digital content item 104 may, for example, be a television show, movie, documentary, or other form of digital content that includes both graphical and visual components. Graphical subtitles 106 may refer to a discrete metadata file that encodes the manner in which subtitles should be rendered in connection with the presentation of digital content item 104. For example, the metadata may comprise information such as when graphical subtitles should be displayed, the font of the graphical subtitles, the font size of the graphical subtitles, the color of the graphical subtitles, visual effects of the graphical subtitle, and so on and so forth.

According to at least one embodiment, graphical subtitle generation system 102 receives digital content item 104 and provides digital content item 104 or a portion thereof to a set of detectors 108 to determine graphical subtitles. The set of detectors may include a plurality of detectors that analyze one or more aspects of digital content item 104 to extract semantic information. Audio, visual, and textual aspects of the digital content item 104 may be separated. The graphical subtitle generation system 102 may detect all aspects of a frame, shot, or sentence of audio. Detectors may be used to determine visual information, such as that an object is in a frame, an explosive sound effect is at a specific location of a video, which portions of a frame are active or inactive, and so on and so forth. According to at least one embodiment, the set of detectors 108 determines semantic information 110 based on audio, visual, and textual aspects of digital content item 104. In various embodiments, the set of detectors comprises one or more visual detectors and one or more audio detectors. The semantic information is used to determine an information map 112. In various embodiments, each piece of semantic information may refer to discrete events that are detected within digital content item 104, such as the location of an object, facial detection features, that a person is shouting in a scene, or so on and so forth. Different pieces of semantic information can be connected to each other via information map 112. For example, in a scene or shot, one event may relate to the actor and another event may be related to the action, which may be linked together to provide a fuller understanding of all of the events.

In various embodiments, semantic role labeling is performed on digital content item 104. Semantic role labeling (SRL) may refer to a natural language processing (NLP) task that involves determining the underlying semantic roles and relationships between the entities, action, and events depicted in digital content item 104. SRL may be used to determine a predicate (e.g., a verb or a verb phrase) that represents an action or event taking place in a scene. Semantic role labeling may be utilized to determine the roles played by the words or phrases that are associated with this predicate. By assigning roles to the different entities involves in the actions of a shot or scene, a better understanding of the actions and actors perform the actions may be achieved. SRL may be used to determine the roles and relationships between characters in a scene, for example, to determine who is a protagonist or antagonist in a scene. SRL can be used to detect and classify specific events and activities in a scene. The events may be verb actions such as "running", "fighting" or "talking" to provide a deeper understanding of scene dynamics. In some embodiments, SRL can contribute to sentiment analysis by identifying the roles involved in expressing emotions or sentiments. SRL can help detect the subject experiencing an emotion, the object or target of that emotion, and the action or event causing the emotion, thereby providing more emotional context into a scene.

According to at least one embodiment of the present disclosure, information map 112 encodes the actors, events, and relationships between various elements that are extracted by the set of detectors 108. In various embodiments, the set of detectors comprises one or more visual detectors and one or more audio detectors. Information map 112 or a portion thereof (e.g., for a scene or shot) is provided to an encoder-decoder 114. In various embodiments, encoder-decoder 114 refers to or is implemented as an artificial intelligence (AI) machine-learning (ML) model that receives some or all of information map 112 and detects emotion or higher-level information, such as macrogenre information. For example, information map 112 may include various events or elements such as visual events of a person's mouth opening and closing and audio elements of shouting, but they need to be connected to a higher-level feeling or emotion, such as scary, sad, happy, etc. In various embodiments, encoder-decoder 114 analyzes the low-level elements and maps them to higher-level information. The higher-level information may correspond to a specific shot or frame and classify it according to the higher-level information. The higher-level information may be determined based on the combination of lower-level information, such as using various visual and audio events to determine that a shot is a happy part of a show or that the weather is cold. This higher-level information can be used to determine a graphical representation. For example, graphical subtitles for a scene with cold weather may be rendered in a blue font or with icicle visual effects that aid in conveying that the cold weather in a frame, shot, or scene. As another example, if the encoder-decoder 114 determines that a shot is funny, representation may be used to determine graphical subtitles that include an emoji or font with playful, friendly, or whimsical aesthetics.

In some embodiments, higher-level information that is determined by encoder-decoder 114 can be used to annotate or tag the lower-level information and indicate which lower-level events, actions, objects, etc. contribute to the higher-level information. For example, encoder-decoder 114 may receive lower-level visual, audio, textual, and dialog information that is utilized to determine that a shot or sequence is humorous. Encoder-decoder 114 may furthermore indicate which elements of the information map 112 contribute or explain how the shot is humorous, such as whether facial gestures, dialog, or other aspects of the shot contribute to the humor of the scene. In various embodiments, the higher-level information, annotations on lower-level information, or other outputs of the encoder-decoder 114 may be fed back into the information map 112.

One aspect of graphical subtitles (e.g., a first stream) is determining lower-level information, higher-level information, classifying them, etc. to detect emotions. Visual information regarding frames, shots, scenes, etc. can be analyzed to determine faces, objects, and other events that are occurring visually to determine which parts of a frame are active or inactive. The placement of graphical subtitles within a frame may be determined based on this information, which may also be determined, at least in part, using information map 112. As an illustrative, non-limiting example, the color palette of a scene may be determined based on visual data gathered from a frame, shot, scene, etc. and may be used to determine various aspects regarding how to represent the graphical subtitle. For example, the information map 112 may be used to determine a dominant color for a region of a frame or shot and can be used to determine text properties such as the font color to display the subtitle that would be suitable for the viewer. In some embodiments, a determination as to whether to have a background color for the subtitle and the color of the background color (if needed) may be determined based on the dominant color of the region of the frame or shot.

According to at least one embodiment of the present disclosure, a first stream of graphical subtitles is detecting emotions as part of higher-level and lower-level information and classifying them and a second stream is detecting lower-level information such as face, object, and actions from the visual aspects of the digital content item and determine which parts of the frame that the emotions are occurring (e.g., active regions) and determine other parts of the frame that are inactive. Active and inactive regions may be determined based on the visual, audio, textual, and dialog information that is extracted and encoded in the information map 112.

Graphical subtitle generation system 102 is utilized to extract a set of relevant feature dealing with tone, mood, humor, excitement, emotion, etc. and then determine how to represent the detected tone, mood, humor, excitement, emotion, etc. as subtitles, according to various embodiments described herein. In an illustrative, non-limiting embodiment, the graphical subtitle generation system 102 determines a representation that includes determining an appropriate layout and location for placing subtitles on the screen in a way that is visually pleasing or stands out or conveys a certain emotion, such as anger or fear.

FIG. 2 illustrates a diagram 200 of a graphical subtitle that blinks in synchronization with the visual aspects of the digital media being shown, in accordance with one or more example embodiments of the present disclosure.

According to at least one embodiment of the present disclosure, FIG. 2 depicts frame 202A and frame 202B of a digital content item, such as a movie or television shown. The digital content item may be processed in accordance with techniques discussed in connection with FIG. 1 to generate a graphical subtitle 204.

Specifically, FIG. 2 depicts an example graphical subtitle in which a graphical subtitle can be used by a content creator to convey fear or horror. Illustrative steps for determining such a graphical subtitle are depicted in FIG. 2 and described herein. At step 206, a system (e.g., a graphical subtitle generation system) will determine the visual aspects of a shot, according to at least one embodiment of the present disclosure. While a shot is discussed herein, these techniques may apply to frames, scenes, or other logical units of a digital content item. The visual aspects of the shot may be determined using various detectors that analyze audio, visual, dialog, etc. of the shot. In various embodiments, the graphical subtitle generation system utilizes one or more visual detectors and one or more audio detectors. For example, one or more visual detectors may process frame 202A and frame 202B and extract semantic information from the frame, such as the fact that there are two characters in the frame and that the characters' eyes are blinking in unison. At time t1, which is depicted as frame 202A, both characters' eyes are open and at time t2 after t1, the characters' eyes are both briefly closed. Detectors may extract other information from the frame, such as speech or audio information.

Semantic information extracted from the shot (e.g., including frame 202A, frame 202B, and other frames of the shot) may be used to populate an information map. The information map may be provided to an encoder-decoder of the graphical subtitle generation system. In various embodiments, step 208 is performed to determine macrogenre and contributing events from the information map. Generally speaking, an encoder-decoder may be used to determine higher-level information about the shot, which may rely on lower-level information (e.g., from detectors) or other higher-level information that was previously annotated in the information map. For example, it is difficult or impossible to use a lower-level detector to determine that a particular shot or scene is scary or the reasons that it is scary. The information map is provided to an encoder-decoder that takes the semantic information extracted from the shot and determines higher-level information about the shot, such as the macrogenre (e.g., scary) and the contributing events that explain why the shot is scary. For example, in some embodiments, the encoder-decoder will identify contributing event in the information map and annotate them with the higher-level information. For example, the graphical subtitle generation system may annotate the shot as "scary" and perform backtracking to see why is it scary. The backtracking provides the reasoning behind it to explain why the shot is scary. Here, specifically, the contributing events may include fast blinking by the characters, blinking in unison, the color mood, and so on and so forth.

In various embodiments, step 210 of a routine to generate graphical subtitles will determine a representation for a graphical subtitle. The representation may be determined based at least in part on the contextually relevant portion of the information map. For example, in FIG. 2, the reason that the shot is scary may be determined to be because of the rapid blinking of the characters' eyes. The representation for the graphical subtitle may, accordingly, reflect the mood or emotion being conveyed by also blinking in synchronization with the characters' eyes. As an example, when the characters' eyes are open at a t1 (frame 202A), the subtitle "Are you afraid?" is shown in the bottom of the screen, and then when the characters' eyes close at frame t2 (frame 202B) as part of rapid blinking, the subtitle disappears, and then at frame t3 (after t2, not shown in FIG. 2) the characters' eyes open again, the subtitle "Are you afraid" reappears. The display and non-display of the subtitle text may be synchronized with the visual aspects of the shot.

Other representations may also be possible. For example, the annotation of emotion and tone is something that could be represented textually. For example, the subtitle may be "[scary] Are you afraid". Text-based graphical subtitles may be utilized for accessibility reasons or for people that are neurodivergent. The use of tone annotations by extracting them from the content themselves and representing them on subtitles can help with audience appreciation or enrich their appreciation of what is going on the screen without necessarily using animations.

Figure 3:
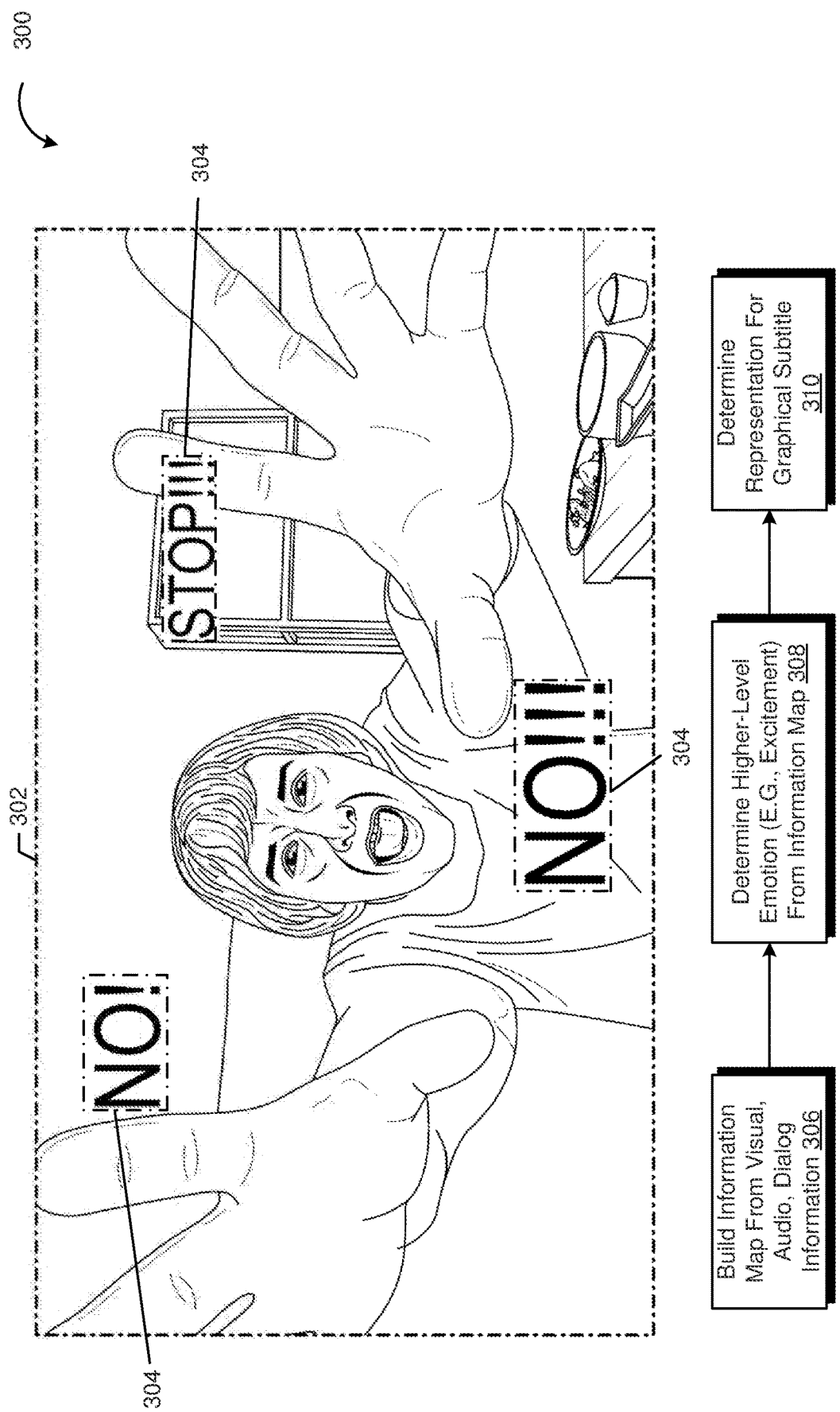
FIG. 3 illustrates a diagram 300 of a graphical subtitle representation based on audio, visual, and dialog information, in accordance with one or more example embodiments of the present disclosure.

FIG. 3 illustrates a diagram 300 of a graphical subtitle representation based on audio, visual, and dialog information, in accordance with one or more example embodiments of the present disclosure.

In various embodiments, FIG. 3 depicts a frame 302 of a digital content item such as a movie or television show. As discussed above in FIG. 1, a graphical subtitle representation may be determined based on various information that is available through the digital content item, which may include visual, audio, and/or dialog information. FIG. 3 depicts various steps that may be involved in determining graphical subtitle 304. In various embodiments, the graphical subtitle generation system utilizes a set of detectors comprises one or more visual detectors and one or more audio detectors to determine the graphical subtitle 304.

A graphical subtitle generation system may perform steps 306-308. At step 306, the system may build an information map from visual, audio, textual, and dialog information available through the digital content item. This may include extracting a variety of types of semantic information from a frame, shot, scene, etc. that include all of the different aspects of the digital content item. In frame 302, for example, the detectors may extract visual information that includes object and facial detection, such as the location of the person's in the middle of the frame, that the person is reaching his arms out, and that he is speaking. Audio detectors may determine the volume level of the person's speech as being very loud. Dialog from the person speaking may be used to determine that the corresponding speech is "No! Stop!!! No!".

In various embodiments, information map includes semantic information extracted from the digital content item, and the information map (or a portion thereof) may be provided to an encoder-decoder that will perform at least part of step 308 to determine higher-level emotion (e.g., excitement) from the information map. The information map encodes the relationships or correlations between different events that are extracted from visual, audio, textual, and dialog information and connections between then represent how they are related. This provides a fuller understanding of an event, and they can be labeled with some a secondary encoder-decoder. The information map (or a portion thereof) may be provided to an encoder-decoder that detects all of the emotion (e.g., excitement) and higher-level information. For example, semantic information extracted from frame 302 and/or adjoining frames depict a person's mouth and that is open and that there is have a shouting part. This may be performed using low-level detectors. However, these low-level events need to connect it to a higher-level feeling or emotion, such as scary, sad, happiness, etc. In various embodiments, there are a set of pre-defined emotions, actions, that are used to map the low-level information to high-level information in an encode-decoder. For a shot or frame or scene, the system can classify that this segment. For example, if the segment is a happy segment, the font may have bubbles or a rainbow or other visual effects to convey happiness. As another example, if the weather in a segment is very cold, the graphical subtitles can be represented in blue or have icy effects. As yet another example, if the segment is funny, the font can be changed to a whimsical font or include emojis to convey such emotions. In various embodiments, the high-level information is analyzed and annotated for each frame of the video or shot.

Returning to FIG. 3, an encoder-decoder may determine, based at least in part on the information map, that the emotion being conveyed in a shot comprising frame 302 corresponds to excitement or another similar emotion. This may be used at step 310 to determine a representation for graphical subtitles, depicted as graphical subtitle 304 in FIG. 3. Based at least in part on the information map and the higher-level information determined in step 308, the representation may involve the use of larger fonts. In various embodiments, the placement of subtitle 304 is determined based on visual aspects of the scene. For example, the information map (e.g., after higher-level emotions are parsed using an encoder decoder) may annotate that the shot is conveying excitement because the person in the middle of the frame is shouting. Accordingly, the graphical subtitle 304 may be placed relative to the person's head and/or mouth rather than the bottom of the screen. In various embodiments, inactive regions or relatively inactive regions around the person's head or mouth are determined based at least in part on information map, and those regions are selected for placement of graphical subtitle 304. For example, the regions of the screen where the person's hands are moving may be considered relatively active regions of the frame and the subtitle placement should avoid such active regions.

Figure 4:
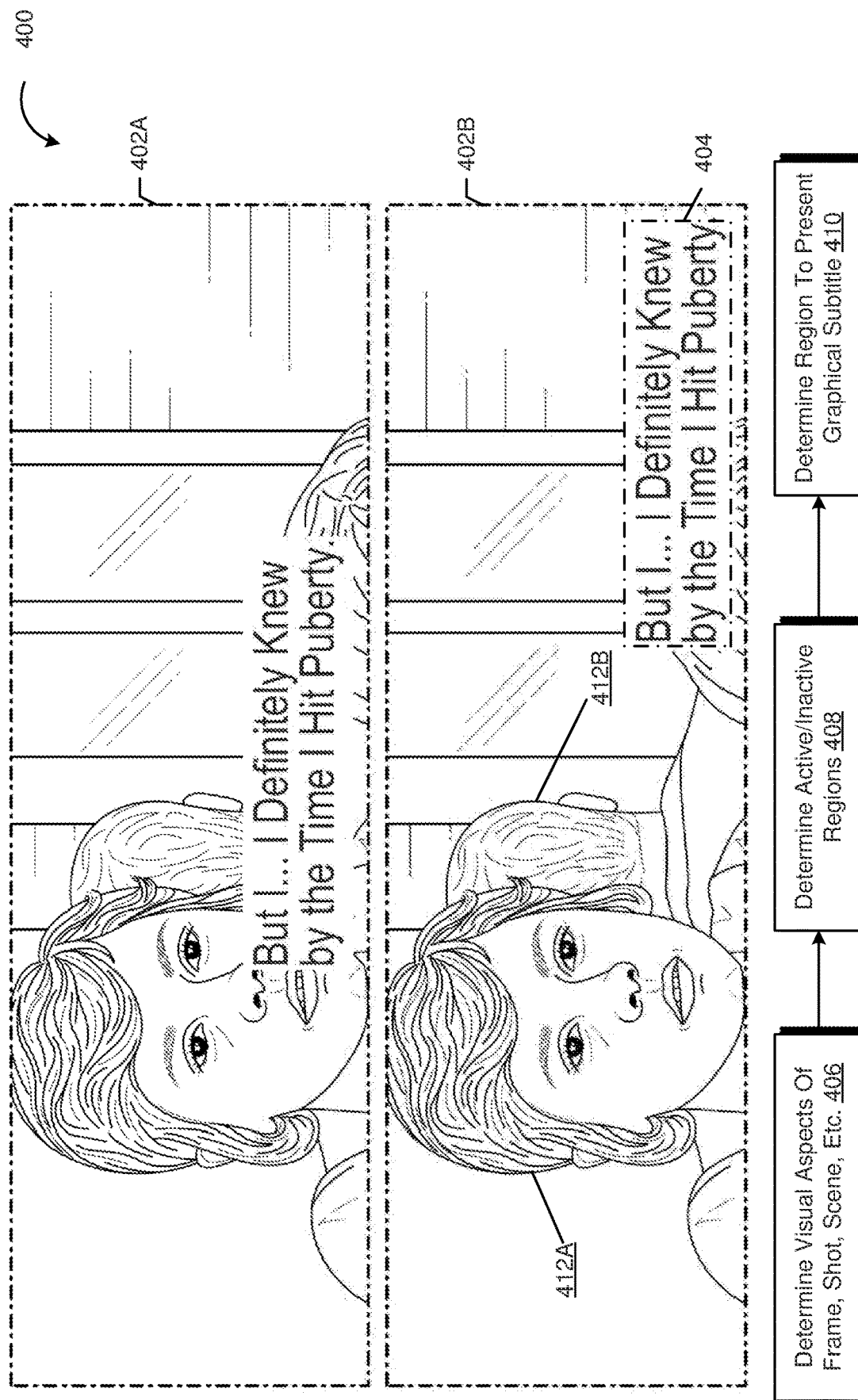
FIG. 4 illustrates a diagram 400 of a graphical subtitle representation whose location is determined based on active and inactive regions of a screen, in accordance with one or more example embodiments of the present disclosure.

FIG. 4 illustrates a diagram 400 of a graphical subtitle representation whose location is determined based on active and inactive regions of a screen, in accordance with one or more example embodiments of the present disclosure.

FIG. 4 depicts two hypothetical ways in which subtitles may be rendered. In frame 402A, conventional means for generating subtitles may involve determining speech in a given shot or scene, determining the corresponding text for the speech, and then displaying the text at a predetermined location and in a predetermined manner (e.g., font type, font size), which is typically centered and at or near the bottom of the screen. Frame 402B depicts an example in which a graphical subtitle 404 is displayed based on active and inactive regions of the screen. In various embodiments, the graphical subtitle generation system utilizes a set of detectors comprising one or more visual detectors and one or more audio detectors to determine graphical subtitle 404.

In various embodiments, a graphical subtitle generation system will perform steps 406-410. In various embodiments, the graphical subtitle generation system performs step 406 to determine visual aspects of a frame, shot, scene, etc. The visual aspects of a digital content item may be determined by various visual detectors, such as those that perform object detection, facial detection, facial recognition, and various other types of detectors. While not depicted in FIG. 4, audio aspects of the frame, shot, scene, etc., may also be extracted, for example, to determine speech that corresponds to lip movement or facial movement.

In various embodiments, semantic information is extracted from detectors and used to determine an information map. The information map may be in accordance with those described elsewhere in this disclosure, for example, in connection with the discussion of FIG. 1. In various embodiments, a graphical subtitle generation system (e.g., as discussed in connection with FIG. 1) uses the information map to perform step 408 to determine active and/or inactive regions of a frame. Active and inactive regions of a frame may be determined based at least in part on the information graph and annotations (e.g., determined from an encoder-decoder that determines higher-level information from lower-level information extracted from detectors such as CV models).

A graphical subtitle generation system may perform step 410 to determine a region to present graphical subtitles. The region may be determined based on active and/or inactive regions of frame 402B. For example, if the information map determines that a first person 412A is speaking with a second person 412B, then the active regions may include both the speaker as well as the person that is being spoken to. Even though person 412B may not be actively performing any actions, the region of the frame that the listener is in is nevertheless still considered an active region because person 412B is the object of the action being performed.

FIG. 5 illustrates a diagram 500 of a graphical subtitle representation whose font and/or background color is determined based on the color palette being presented, in accordance with one or more example embodiments of the present disclosure.

Various techniques described herein may be implemented in the context of FIG. 5. Frame 502A depicts a subtitle which may be generated (e.g., using techniques described in connection with FIGS. 1-4). The subtitle text in frame 502A does not have a colored background, and may be difficult to see. For example, in some cases there may not be a suitable region of the screen the present the subtitle text in a single color, which may be due to different colors being shown on the screen that make it difficult to select a single font color that is suitable across all the different colors being presented.

Graphical subtitle 504 may be generated by a graphical subtitle generation system that performs steps 506-510. It is noted that graphical subtitle 504 depicted in FIG. 5 may have a solid background color and a font color that are different from each other. In various embodiments, the graphical subtitle generation system performs step 506 to determine visual aspects of a frame, shot, scene, etc. The visual aspects of a digital content item may be determined by various visual detectors, such as those that perform object detection, facial detection, facial recognition, and various other types of detectors. While not depicted in FIG. 5, audio aspects of the frame, shot, scene, etc., may also be extracted, for example, to determine speech that corresponds to lip movement or facial movement.

At step 508, the system may determine a color palette of the frame, shot, scene, etc. or portions thereof. For example, different regions of the frame may be classified as active or inactive regions and may have a dominant color for a region of a frame or shot and can be used to determine the font color to display the subtitle that would be suitable for the viewer. In some embodiments, a determination as to whether to have a background color for the subtitle and the color of the background color (if needed) may be determined based on the dominant color of the region of the frame or shot.

At step 510, the system may determine a font color and background for the graphical subtitle. The font color and the background may be selected based on the dominant color of the frame being shown. In various embodiments, contextually relevant information map elements or events may be used to determine the font color and/or background color.

As an illustrative example, consider a hypothetical scene from a movie or show in which two magical wizards (e.g., a protagonist and antagonist) are preparing to fight each other. As an illustrative, non-limiting example, dialog, audio, and visual information of the scene may be used to determine a graphical subtitle in which the subtitle text for the incantation is animated and stylized, for example, by stylizing the words being uttered by each character in their corresponding dominant colors (e.g., green text for antagonist, red text for protagonist).

Figure 6:
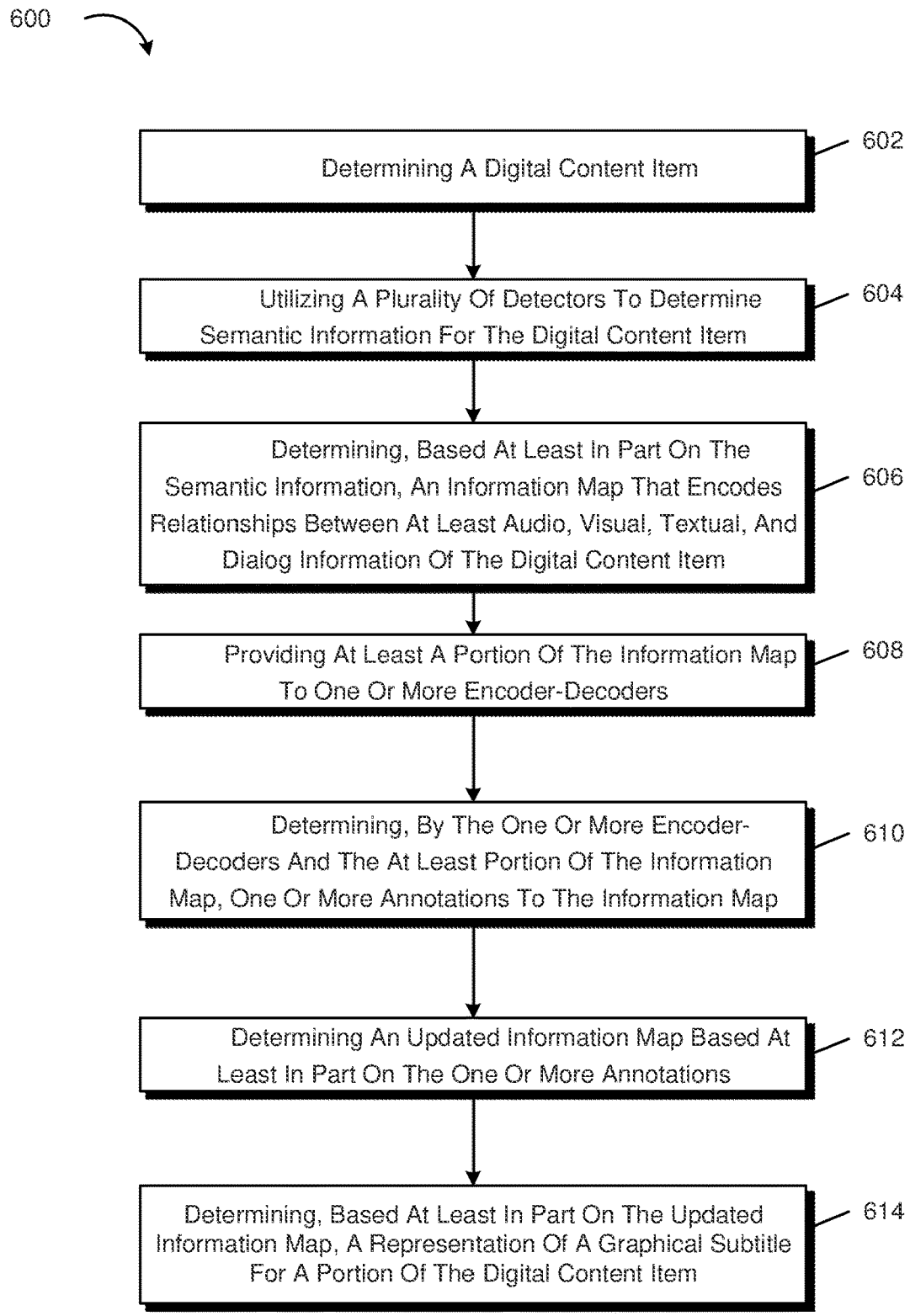
FIG. 6 shows an illustrative example of a process 600 for determining graphical subtitles, in accordance with one or more example embodiments of the present disclosure.

FIG. 6 shows an illustrative example of a process 600 for determining graphical subtitles, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-5 and 7. In at least one embodiment, process 600 or a portion thereof is implemented by a cloud service provider.

In various embodiments, process 600 comprises a step 602 for determining a digital content item. A digital content item may refer to a television show, movie, or other media with visual and audio aspects. In various embodiments, the digital content item is a multimedia file. In some embodiments, a digital content item can refer to a multimedia stream or segments thereof that are streamed in real-time or on demand.

In various embodiments, process 600 comprises a step 604 for utilizing a plurality of detectors to determine semantic information for the digital content item. The plurality of detectors may include a plurality of detectors that analyze one or more aspects of the determined digital content item to extract semantic information. Audio, visual, and textual aspects of the digital content item may be separated. The graphical subtitle generation system may detect all aspects of a frame, shot, or sentence of audio. Detectors may be used to determine visual information, such as that an object is in a frame, an explosive sound effect is at a specific location of a video, which portions of a frame are active or inactive, and so on and so forth. According to at least one embodiment, the plurality of detectors determines semantic information based on audio, visual, and textual aspects of digital content item. In various embodiments, the plurality of detectors comprises one or more visual detectors and one or more audio detectors.

In various embodiments, process 600 comprises a step 606 for determining, based at least in part on the semantic information, an information map that encodes relationships between at least audio, visual, and dialog information of the digital content item. The semantic information extracted by the detector is used to determine an information graph. In various embodiments, each piece of semantic information may refer to discrete events that are detected within the digital content item, such as the location of an object, facial detection features, that a person is shouting in a scene, or so on and so forth. Different pieces of semantic information can be connected to each other via information graph. For example, in a scene or shot, one event may relate to the actor and another event may be related to the action, which may be linked together to provide a fuller understanding of all of the events.

In various embodiments, process 600 comprises a step 608 for providing at least a portion of the information map to one or more encoder-decoders. In various embodiments, encoder-decoder refers to or is implemented as an artificial intelligence (AI) machine-learning (ML) model such as a deep learning model that receives some or all of information map and detects emotion or higher-level information, such as macrogenre information. For example, information map may include various events or elements such as visual events of a person's mouth opening and closing and audio elements of shouting, but they need to be connected to a higher-level feeling or emotion, such as scary, sad, happy, etc. In various embodiments, encoder-decoder analyzes the low-level elements and maps them to higher-level information. The higher-level information may correspond to a specific shot or frame and classify it according to the higher-level information. The higher-level information may be determined based on the combination of lower-level information, such as using various visual and audio events to determine that a shot is a happy part of a show or that the weather is cold. This higher-level information can be used to determine a graphical representation. For example, graphical subtitles for a scene with cold weather may be rendered in a blue font or with icicle visual effects that aid in conveying that the cold weather in a frame, shot, or scene. As another example, if the encoder-decoder determines that a shot is funny, representation may be used to determine graphical subtitles that include an emoji or font with playful, friendly, or whimsical aesthetics.

In various embodiments, the one or more encoder-decoders determines a macrogenre for the portion of the digital content item and the one or more annotations indicate one or more events of the portion of the digital content item that contribute to the macrogenre being contextually relevant to the portion of the digital content item. For example, seman- tic role labeling (SRL) may be used to annotate or tag various events, actions, objects, etc. that help to explain why a macrogenre or higher-level classifications are contextually relevant to a particular portion of the digital content item (e.g., to a specific frame, shot, scene, etc.)

In various embodiments, process 600 comprises a step 610 for determining, by the one or more encoder-decoders and the at least portion of the information map, one or more annotations to the information map. In some embodiments, higher-level information that is determined by the one or more encoder-decoders can be used to annotate or tag the lower-level information and indicate which lower-level events, actions, objects, etc. contribute to the higher-level information. For example, the one or more encoder-decoders may receive lower-level visual, audio, textual, and dialog information that is utilized to determine that a shot or sequence is humorous. The one or more encoder-decoders may furthermore indicate which elements of the information map contribute or explain how the shot is humorous, such as whether facial gestures, dialog, or other aspects of the shot contribute to the humor of the scene. In various embodiments, the higher-level information, annotations on lower-level information, or other outputs of the one or more encoder-decoders may be fed back into the information map to produce an updated information map, as depicted in FIG. 6 as step 612 of process 600.

In various embodiments, process 600 comprises a step 614 for determining, based at least in part on the updated information map, a representation of a graphical subtitle for a portion of the digital content item. Various aspects of graphical subtitles may be determined using an information map (e.g., an updated information with annotations from encoder-decoders). In various embodiments, some or all of the representations described in connection with FIGS. 2-5 may be implemented in the context of FIG. 6. The determination of the representation of the graphical subtitle may comprise determining a visual effect to apply based at least in part on one or more visual aspects of the portion of the digital content item. For example, graphical subtitles for a scene with cold weather may be rendered with icicle visual effects that aid in conveying that the cold weather in a frame, shot, or scene. In various embodiments, the determining the representation of the graphical subtitle comprises selecting one or more text properties for the graphical subtitle. For example, if the encoder-decoder determines that a shot is funny, representation may be used to determine graphical subtitles that include an emoji or font with playful, friendly, or whimsical aesthetics. In various embodiments, the determining the representation of the graphical subtitle comprises determining one or more active region and inactive regions for the portion of the digital content item.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/ or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 7:
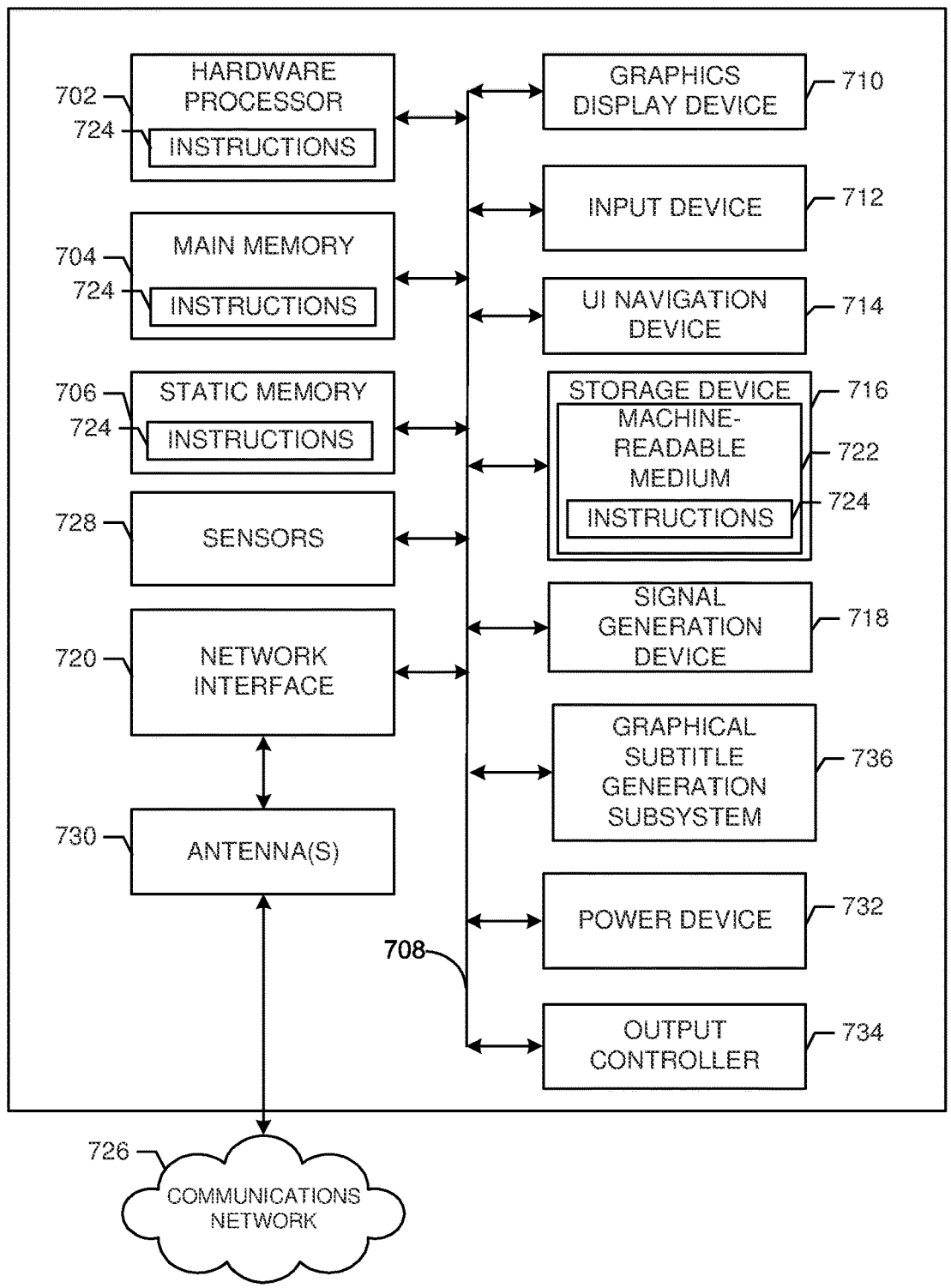
FIG. 7 illustrates a block diagram of an example machine 700 upon which any of one or more techniques (e.g., methods) may be performed, in accordance with one or more example embodiments of the present disclosure.

FIG. 7 illustrates a block diagram of an example of a machine 700 (e.g., implemented in whole or in part in the context of embodiments described in connection with other figures. In some embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include any combination of the illustrated components. For example, the machine 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (e.g., drive unit) 716, a signal generation device 718, and a network interface device/transceiver 720 coupled to antenna(s) 730. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

In various embodiments, graphical subtitle generation subsystem 736 refers to a component (e.g., hardware, software, or a combination thereof) that is implemented in the context of machine 700. Graphical subtitle generation subsystem 736 may be utilized to implement some or all of the functionality described in connection with FIGS. 1-6 above.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V)

device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may omitted from various discussions for the sake of clarity.

What is claimed is:

1. A computer-implemented method, comprising:
   determining a digital content item;
   utilizing a plurality of detectors to determine semantic information for the digital content item collected from a sequence of visual frames of the digital content item;
   determining subtitle text for the sequence of visual frames;
   determining, based at least in part on the semantic information, an information map that encodes relationships between at least audio, visual, textual, and dialog information of the digital content item, wherein the information map comprises at least a first non-speaking visual event in the sequence of visual frames;
   providing at least a portion of the information map to one or more encoder-decoders;
   determining, by the one or more encoder-decoders and the at least portion of the information map, one or more annotations to the information map;
   determining an updated information map based at least in part on the one or more annotations;
   determining, based at least in part on the updated information map and the first non-speaking visual event, a visual effect; and
   synchronizing presentation of the visual effect with the subtitle text.

2. The computer-implemented method of claim 1, wherein the plurality of detectors comprises one or more visual detectors and one or more audio detectors.

3. The computer-implemented method of claim 1, wherein:
   the one or more encoder-decoders determines a macrogenre for the portion of the digital content item; and
   the one or more annotations indicate one or more events of the portion of the digital content item that contributes to the macrogenre being contextually relevant to the portion of the digital content item.

4. The computer-implemented method of claim 1, further comprising:
   determining to present the subtitle text during a first portion of the sequence of visual frames in synchronization with the first non-speaking visual event; and
   determining to omit presentation of the subtitle text during a second portion of the visual sequence of visual frames in synchronization with a second non-speaking visual event.

5. The computer-implemented method of claim 1, further comprising determining one or more active region and inactive regions for the sequence of visual frames.

6. The computer-implemented method of claim 1, further comprising selecting one or more text properties for the subtitle text.

7. A system, comprising:
   one or more processors; and
   memory storing executable instructions that, as a result of execution by the one or more processors, cause the system to:

determine a set of semantic information for a digital content item, wherein the set of semantic information is extracted based at least in part on audio, visual, textual, and dialog information from a sequence of frames of the digital content item;

determine an information map that encodes relationships for the set of semantic information, wherein the information map comprises at least a first non-speaking visual event determined to be in the sequence of frames;

determine, based at least in part on the information map, one or more annotations that associate a portion of the information map to a macrogenre;

determine, based at least in part on the information map, the first non-speaking visual event, and the one or more annotations, a visual effect; and synchronize presentation of the visual effect with a subtitle text.

8. The system of claim 7, wherein the executable instruction, as a result of execution by the one or more processors, further cause the system to:

use one or more encoder-decoders to determine the one or more annotations based at least in part on the information map.

9. The system of claim 8, wherein:

the one or more encoder-decoders determines the macrogenre for the portion of the digital content item; and the one or more annotations indicate one or more events of the portion of the digital content item that contributes to the macrogenre being contextually relevant to the portion of the digital content item.

10. The system of claim 7, wherein the set of semantic information is determined based at least in part by a set of detectors comprising one or more visual detectors and one or more audio detectors.

11. The system of claim 7, wherein the visual effect comprises at least one of: a font color, font type, font size or background color based at least in part on one or more visual aspects of the digital content item.

12. The system of claim 7, wherein the instructions to synchronize the presentation include instructions that, as a result of execution by the one or more processors, cause the system to:

display the subtitle text in association with the first non-speaking visual event;

determine a second non-speaking visual event in the information map; and omit display of the subtitle text in association with the second non-speaking visual event.

13. The system of claim 7, wherein the executable instruction, as a result of execution by the one or more processors, further causes the system to determine one or more active regions and inactive regions for the portion of the digital content item.

14. A non-transitory computer-readable storage medium storing executable instructions that, as a result of being executed by one or more processors of a computer system, cause the computer system to at least:

determine a set of semantic information for a digital content item, wherein the set of semantic information is extracted based at least in part on audio, visual, textual, and dialog information from a sequence of frames of the digital content item;

determine an information map that encodes relationships for the set of semantic information, wherein the information map comprises at least a first non-speaking visual event determined to be in the sequence of frames;

determine, based at least in part on the information map, one or more annotations that associate a portion of the information map to a macrogenre;

determine, based at least in part on the information map, the first non-speaking visual event, and the one or more annotations, a visual effect; and synchronize presentation of the visual effect with a subtitle text.

15. The non-transitory computer-readable storage medium of claim 14, wherein the executable instruction, as a result of execution by the one or more processors, further cause the computer system to:

use one or more encoder-decoders to determine the one or more annotations based at least in part on the information map.

16. The non-transitory computer-readable storage medium of claim 15, wherein:

the one or more encoder-decoders determines the macrogenre for the portion of the digital content item; and the one or more annotations indicate one or more events of the portion of the digital content item that contributes to the macrogenre being contextually relevant to the portion of the digital content item.

17. The non-transitory computer-readable storage medium of claim 14, wherein the visual effect comprises at least one of: a font color, font type, font size or background color based at least in part on one or more visual aspects of the digital content item.

18. The non-transitory computer-readable storage medium of claim 14, wherein the executable instruction, as a result of execution by the one or more processors, further cause the computer system to:

display the subtitle text in association with the first non-speaking visual event;

determine a second non-speaking visual event in the information map; and omit display of the subtitle text in association with the second non-speaking visual event.

19. The non-transitory computer-readable storage medium of claim 14, wherein the executable instruction, as a result of execution by the one or more processors, further cause the computer system to determine one or more active regions and inactive regions for the portion of the digital content item.

20. The non-transitory computer-readable storage medium of claim 14, wherein the set of semantic information is determined based at least in part by a set of detectors comprising one or more visual detectors and one or more audio detectors.

* * * * *